United States Patent
Kuroda

(10) Patent No.: US 10,552,460 B2
(45) Date of Patent: Feb. 4, 2020

(54) SENSOR DATA MANAGEMENT APPARATUS, SENSOR DATA MANAGEMENT METHOD, AND COMPUTER PROGRAM PRODUCT

(71) Applicant: KABUSHIKI KAISHA TOSHIBA, Minato-ku, Tokyo (JP)

(72) Inventor: Yosuke Kuroda, Kawasaki Kanagawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 319 days.

(21) Appl. No.: 15/451,647

(22) Filed: Mar. 7, 2017

(65) Prior Publication Data

US 2017/0270183 A1 Sep. 21, 2017

(30) Foreign Application Priority Data

Mar. 17, 2016 (JP) .................................. 2016-054497

(51) Int. Cl.
*G06F 16/00* (2019.01)
*G06F 16/28* (2019.01)
*G06F 16/22* (2019.01)
*G06F 16/21* (2019.01)
*H04Q 9/00* (2006.01)

(52) U.S. Cl.
CPC .......... *G06F 16/285* (2019.01); *G06F 16/211* (2019.01); *G06F 16/22* (2019.01); *H04Q 9/00* (2013.01)

(58) Field of Classification Search
CPC .... G06F 16/22; G06F 16/2477; G06F 16/285; G06F 16/211
See application file for complete search history.

(56) References Cited

U.S. PATENT DOCUMENTS

| 7,577,159 B2 | 8/2009 | Horikawa | |
| 2002/0181799 A1* | 12/2002 | Matsugu | G06K 9/00281 |
| | | | 382/260 |
| 2007/0005306 A1* | 1/2007 | Foessel | G01S 13/723 |
| | | | 702/189 |

(Continued)

FOREIGN PATENT DOCUMENTS

| JP | 2009-009304 | 1/2009 |
| JP | 4311312 | 5/2009 |

(Continued)

*Primary Examiner* — Merilyn P Nguyen
(74) *Attorney, Agent, or Firm* — Amin, Turocy & Watson, LLP

(57) ABSTRACT

A sensor data management apparatus according to an embodiment stores pieces of sensor data in data areas provided corresponding to prescribed data units and manages the pieces of sensor data. The pieces of sensor data have been input from a plurality of sensors. The sensor data management apparatus includes a group determining unit and a data storing unit. The group determining unit is configured to analyze the pieces of stored sensor data and determine groups of sensors based on a result of the analysis. The data storing unit is configured to determine a storage location of a newly input piece of sensor data to store pieces of sensor data from sensors belonging to the same one of the groups in the same one of the data areas, and store the piece of sensor data at the storage location.

8 Claims, 15 Drawing Sheets

(56) References Cited

U.S. PATENT DOCUMENTS

| | | | | |
|---|---|---|---|---|
| 2012/0290950 | A1* | 11/2012 | Rapaport | H04L 51/32 |
| | | | | 715/753 |
| 2014/0101082 | A1* | 4/2014 | Matsuoka | H04L 12/2829 |
| | | | | 706/12 |
| 2014/0122022 | A1 | 5/2014 | Chen et al. | |
| 2015/0080044 | A1* | 3/2015 | McHenry | H04W 16/14 |
| | | | | 455/515 |
| 2015/0160636 | A1* | 6/2015 | McCarthy, III | G05B 15/02 |
| | | | | 348/552 |
| 2016/0327417 | A1* | 11/2016 | Hara | G05B 23/0221 |
| 2017/0055128 | A1* | 2/2017 | Smith | H04W 4/029 |
| 2017/0064515 | A1* | 3/2017 | Heikkila | H04W 4/026 |
| 2017/0195953 | A1* | 7/2017 | Amorim de Faria Cardote | |
| | | | | H04L 67/12 |
| 2018/0231387 | A1* | 8/2018 | Thiel | G01C 21/3602 |

FOREIGN PATENT DOCUMENTS

| | | |
|---|---|---|
| JP | 2015-133062 | 7/2015 |
| JP | 2015-141087 | 8/2015 |
| WO | 2017/002190 | 1/2017 |

* cited by examiner

| PAGE NUMBER | IN-PAGE OFFSET |

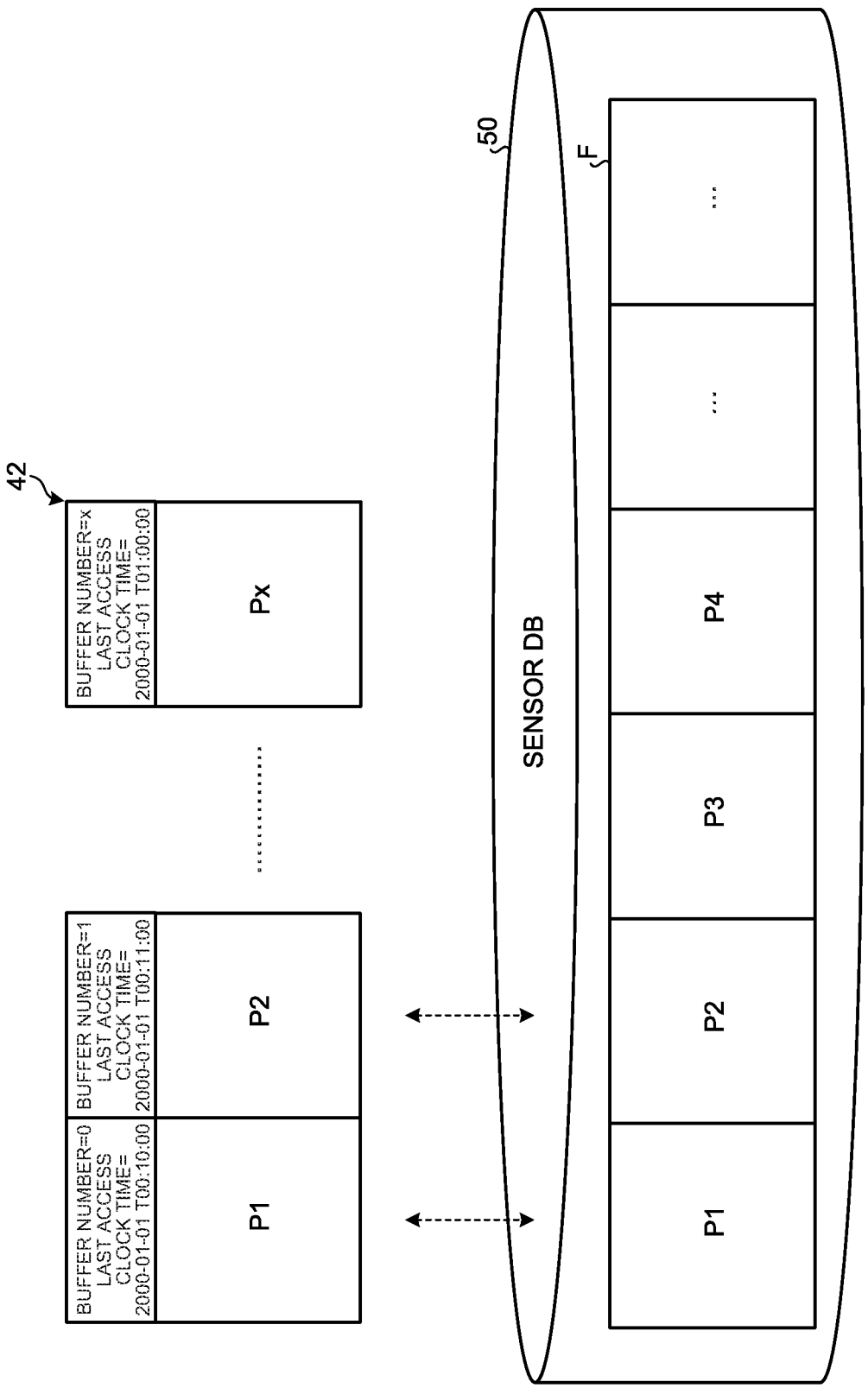

FIG.9

| SENSOR ID | END DATA BLOCK NUMBER | REGISTRATION INTERVAL | ARRIVAL TIME | UPDATE FREQUENCY | LAST UPDATE CLOCK TIME | GROUP NUMBER |
|---|---|---|---|---|---|---|
| S1 | (9, 0) | 1 MIN | EVERY 0 SEC | 1 MIN | 2000-01-01 T13:20:00 | 0 |
| S2 | (9, 1024) | 1 MIN | EVERY 0 SEC | 1 MIN | 2000-01-01 T13:20:00 | 0 |
| S3 | (9, 2048) | 1 MIN | EVERY 0 SEC | 1 MIN | 2000-01-01 T13:20:00 | 0 |
| S4 | (9, 3072) | 1 MIN | EVERY 15 SEC | 1 MIN | 2000-01-01 T13:20:00 | 0 |
| S5 | (10, 0) | 1 MIN | EVERY 15 SEC | 1 MIN | 2000-01-01 T13:20:15 | 1 |
| S6 | (10, 512) | 1 MIN | EVERY 15 SEC | 1 MIN | 2000-01-01 T13:20:15 | 1 |
| S7 | (10, 1536) | 1 MIN | EVERY 15 SEC | 1 MIN | 2000-01-01 T13:20:15 | 1 |
| S8 | (10, 2048) | 1 MIN | EVERY 0 SEC | 1 MIN | 2000-01-01 T13:20:15 | 1 |
| S9 | (3, 0) | 15 MIN | EVERY 0 SEC | 1 MIN | 2000-01-01 T13:20:00 | 2 |
| S10 | (3, 512) | 15 MIN | EVERY 0 SEC | 1 MIN | 2000-01-01 T13:20:00 | 2 |
| S11 | (3, 1536) | 15 MIN | EVERY 0 SEC | 1 MIN | 2000-01-01 T13:20:00 | 2 |
| S12 | (3, 2048) | 15 MIN | EVERY 0 SEC | 1 MIN | 2000-01-01 T13:20:00 | 2 |
| S13 | (4, 0) | 15 MIN | EVERY 0 SEC | 15 MIN | 2000-01-01 T13:15:00 | 3 |
| S14 | (4, 2048) | 15 MIN | EVERY 0 SEC | 15 MIN | 2000-01-01 T13:15:00 | 3 |
| S15 | (5, 0) | 15 MIN | EVERY 0 SEC | 15 MIN | 2000-01-01 T13:15:00 | 3 |
| S16 | (5, 2048) | 15 MIN | EVERY 0 SEC | 15 MIN | 2000-01-01 T13:15:00 | 3 |

| SENSOR ID | END DATA BLOCK NUMBER | REGISTRATION INTERVAL | ARRIVAL TIME | UPDATE FREQUENCY | LAST UPDATE CLOCK TIME | GROUP NUMBER |
|---|---|---|---|---|---|---|
| S1 | (51, 0) | 1 MIN | EVERY 0 SEC | 1 MIN | 2000-01-01 T20:05:00 | 0 |
| S2 | (51, 1024) | 1 MIN | EVERY 0 SEC | 1 MIN | 2000-01-01 T20:05:00 | 0 |
| S3 | (40, 2048) | 1 MIN | EVERY 0 SEC | 1 MIN | 2000-01-01 T17:59:00 | 0 |
| S4 | (40, 3072) | 1 MIN | EVERY 0 SEC | 1 MIN | 2000-01-01 T17:59:00 | 0 |
| S5 | (52, 0) | 1 MIN | EVERY 15 SEC | 1 MIN | 2000-01-01 T20:05:15 | 1 |
| S6 | (52, 512) | 1 MIN | EVERY 15 SEC | 1 MIN | 2000-01-01 T20:05:15 | 1 |
| S7 | (41, 1536) | 1 MIN | EVERY 15 SEC | 1 MIN | 2000-01-01 T17:59:15 | 1 |
| S8 | (41, 2048) | 1 MIN | EVERY 15 SEC | 1 MIN | 2000-01-01 T17:59:15 | 1 |
| S9 | (24, 0) | 15 MIN | EVERY 0 SEC | 1 MIN | 2000-01-01 T20:05:00 | 2 |
| S10 | (24, 512) | 15 MIN | EVERY 0 SEC | 1 MIN | 2000-01-01 T20:05:00 | 2 |
| S11 | (24, 1536) | 15 MIN | EVERY 0 SEC | 1 MIN | 2000-01-01 T20:05:00 | 2 |
| S12 | (24, 2048) | 15 MIN | EVERY 0 SEC | 15 MIN | 2000-01-01 T20:05:00 | 3 |
| S13 | (25, 0) | 15 MIN | EVERY 0 SEC | 15 MIN | 2000-01-01 T20:05:00 | 3 |
| S14 | (25, 2048) | 15 MIN | EVERY 0 SEC | 15 MIN | 2000-01-01 T20:05:00 | 3 |
| S15 | (26, 0) | 15 MIN | EVERY 0 SEC | 15 MIN | 2000-01-01 T20:05:00 | 3 |
| S16 | (26, 2048) | 15 MIN | EVERY 0 SEC | 15 MIN | 2000-01-01 T20:05:00 | 3 |

| SENSOR ID | END DATA BLOCK NUMBER | REGISTRATION INTERVAL | ARRIVAL TIME | UPDATE FREQUENCY | LAST UPDATE TIME | GROUP NUMBER |
|---|---|---|---|---|---|---|
| S1 | (51, 0) | 1 MIN | EVERY 0 SEC | 1 MIN | 2000-01-01 T20:05:00 | 5 |
| S2 | (51, 1024) | 1 MIN | EVERY 0 SEC | 1 MIN | 2000-01-01 T20:05:00 | 5 |
| S3 | (40, 2048) | 1 MIN | EVERY 0 SEC | 126 MIN | 2000-01-01 T17:59:00 | 6 |
| S4 | (40, 3072) | 1 MIN | EVERY 0 SEC | 126 MIN | 2000-01-01 T17:59:00 | 6 |
| S5 | (52, 0) | 1 MIN | EVERY 15 SEC | 1 MIN | 2000-01-01 T20:05:15 | 7 |
| S6 | (52, 512) | 1 MIN | EVERY 15 SEC | 1 MIN | 2000-01-01 T20:05:15 | 7 |
| S7 | (41, 1536) | 1 MIN | EVERY 15 SEC | 126 MIN | 2000-01-01 T17:59:15 | 8 |
| S8 | (41, 2048) | 1 MIN | EVERY 15 SEC | 126 MIN | 2000-01-01 T17:59:15 | 8 |
| S9 | (24, 0) | 15 MIN | EVERY 0 SEC | 1 MIN | 2000-01-01 T20:05:00 | 9 |
| S10 | (24, 512) | 15 MIN | EVERY 0 SEC | 1 MIN | 2000-01-01 T20:05:00 | 9 |
| S11 | (24, 1536) | 15 MIN | EVERY 0 SEC | 1 MIN | 2000-01-01 T20:05:00 | 9 |
| S12 | (24, 2048) | 15 MIN | EVERY 0 SEC | 1 MIN | 2000-01-01 T20:05:00 | 9 |
| S13 | (25, 0) | 15 MIN | EVERY 0 SEC | 15 MIN | 2000-01-01 T20:05:00 | 10 |
| S14 | (25, 2048) | 15 MIN | EVERY 0 SEC | 15 MIN | 2000-01-01 T20:05:00 | 10 |
| S15 | (26, 0) | 15 MIN | EVERY 0 SEC | 15 MIN | 2000-01-01 T20:05:00 | 10 |
| S16 | (26, 2048) | 15 MIN | EVERY 0 SEC | 15 MIN | 2000-01-01 T20:05:00 | 10 |

51

SENSOR DATA MANAGEMENT APPARATUS, SENSOR DATA MANAGEMENT METHOD, AND COMPUTER PROGRAM PRODUCT

CROSS-REFERENCE TO RELATED APPLICATIONS

This application is based upon and claims the benefit of priority from Japanese Patent Application No. 2016-054497, filed on Mar. 17, 2016; the entire contents of which are incorporated herein by reference.

FIELD

Embodiments described herein relate generally to a sensor data management apparatus, a sensor data management method, and a computer program product.

BACKGROUND

Conventionally, sensor data management apparatuses have been known that store and manage time-series data (sensor data) transmitted from a plurality of sensors. The sensor data is characterized in that the data is registered in chronological order and that, in most cases, a periodicity is observed in clock times when the data is registered. Conventional sensor data management apparatuses of the relational database management system (RDBMS) type in most cases each store and manage pieces of sensor data acquired from a plurality of sensors in a common table while treating the respective pieces of sensor data as records for which the IDs of the respective sensors and clock times are used as keys. This technique is, however, disadvantageous in that it involves complicated management because data increases for storing the sensor IDs and because there is no guarantee that the pieces of sensor data are registered in chronological order.

To resolve this disadvantage, sensor data management apparatuses in some cases employ a technique such that sensor data is managed on a sensor-to-sensor basis. In comparison with the technique of using a common table to manage sensor data acquired from a plurality of sensors, this technique is advantageous because it involves a smaller amount of data. This technique enables efficient search because pieces of sensor data are lined up in groups in chronological order.

In recent years, sensor apparatuses that are connected to networks have been increasingly common as words such as IoT (Internet of things) and M2M (Machine-to-Machine) represent. When a massive amount of sensor data of various kinds is managed, a technique in which the data is managed on a sensor-to-sensor basis involves a risk of decreasing the processing speed. That is, in such a technique, sensor data is stored after data areas are secured for corresponding sensors, which means that the sensor data needs to be read out from a file stored in, for example, a hard disk drive (HDD) into a buffer on a memory and be written into a file from the buffer on a sensor-to-sensor basis. Consequently, when sensor data of multiple different sensors are successively accessed, the sensor data that are accessed is less likely on the buffer, and a large amount of read and write processing is incurred to the extent that decreases the processing speed.

To overcome this inconvenience, an attempt has been made to decrease the processing speed by dividing multiple sensors into groups and preparing two databases that are one configured to manage sensor data on a group-to-group basis and the other configured to manage sensor data on a sensor-to-sensor basis. For example, the Specification of US Patent Published Application No. 2014/0122022 discloses a sensor data management apparatus configured to: store sensor data in a first database on a group-to-group basis when the sensor data is registered; and, when a certain amount of data has accumulated in the first database, transfer the sensor data stored in the first database to second databases prepared for the respective sensors.

This technique allows for reading and writing data between a buffer and each file on a group-to-group basis. Consequently, if multiple sensors can be grouped in a manner that allows the same group to consist of sensors that register sensor data at clock times close to one another, a high buffer hit rate can be achieved. When a large number of sensors are registered by various applications, however, this technique has difficulty appropriately grouping multiple sensors based on information provided by the applications beforehand; more specifically, this technique can appropriately group the sensors with respect to each application but has difficulty grouping the sensors across the applications, for example. When a plural pieces of data are managed using one table, schemas of the managed sensor data need to be the same, and kinds of sensors that can be put into a group are therefore limited. Furthermore, one piece of sensor data is managed using a plurality of databases, which makes it necessary to establish a storage process and a search process for each of the two databases having different formats, resulting in a complicated mechanism.

As described above, conventional sensor data management apparatuses have disadvantages due to the techniques employed therein, and need to be improved for higher efficiency in storage and management of sensor data.

BRIEF DESCRIPTION OF THE DRAWINGS

FIG. 8 is a diagram illustrating an example of a page buffer;

FIG. 9 is a diagram illustrating an example of sensor allocation information;

FIG. 15 is a diagram illustrating an example of sensor allocation information at a certain clock time; and FIG. 16 is a diagram illustrating the state of the sensor allocation information after the elapse of a certain time period from FIG. 15.

DETAILED DESCRIPTION

A sensor data management apparatus according to an embodiment is an apparatus configured to store pieces of sensor data each input from a sensor among a plurality of sensors in data areas provided corresponding to prescribed data units and manage the pieces of sensor data. This sensor data management apparatus includes a group determining unit and a data storing unit. The group determining unit analyzes the sensor data stored and, based on the analysis result, determines a group of sensors. The data storing unit determines a storage location of a newly input piece of sensor data to store pieces of sensor data from sensors belonging to the same one of the groups in the same one of the data areas, and stores the piece of sensor data at the storage location.

The following describes a sensor data management apparatus, a sensor data management method, and a computer program product according to the embodiment in detail with reference to the drawings.

Figure 1:
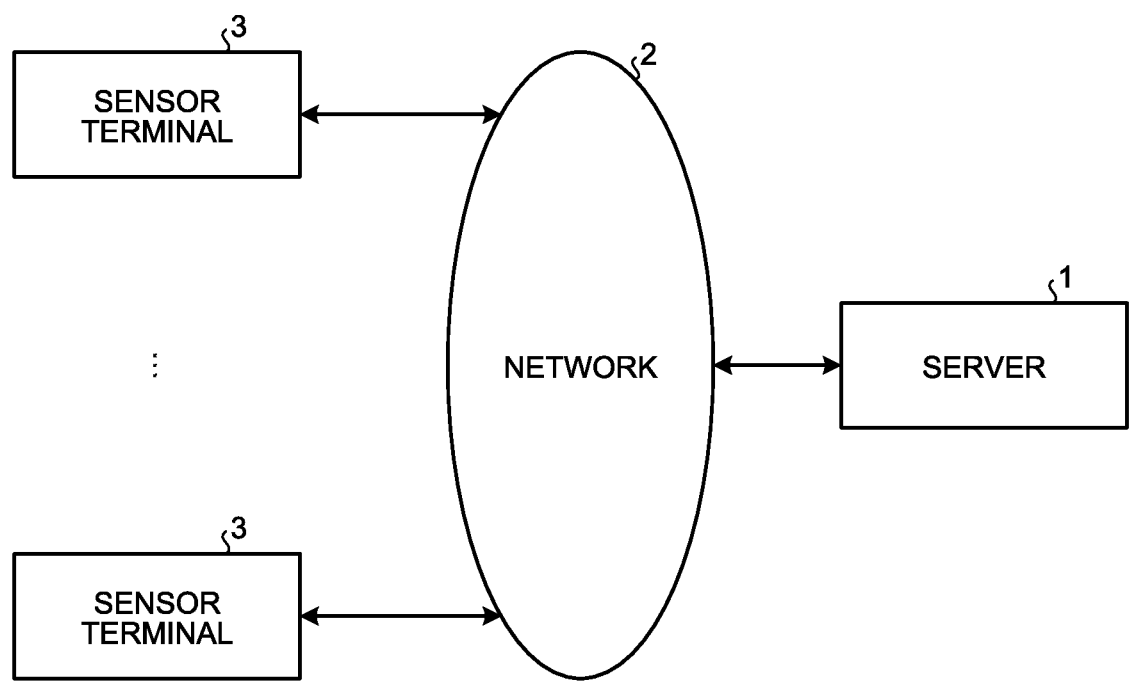
FIG. 1 is a schematic diagram illustrating a schematic configuration of a sensor data management system.

FIG. 1 is a schematic diagram illustrating a schematic configuration of the sensor data management system according to this embodiment. Here, a server-client system is assumed as the sensor data management system according to this embodiment, the server client system including: a server computer (hereinafter referred to as a server) 1 serving as the sensor data management apparatus; and a plurality of sensor-embedded computers (hereinafter referred to as sensor terminals) 3 connected to the server computer through a network 2 such as a local area network (LAN).

Figure 2:
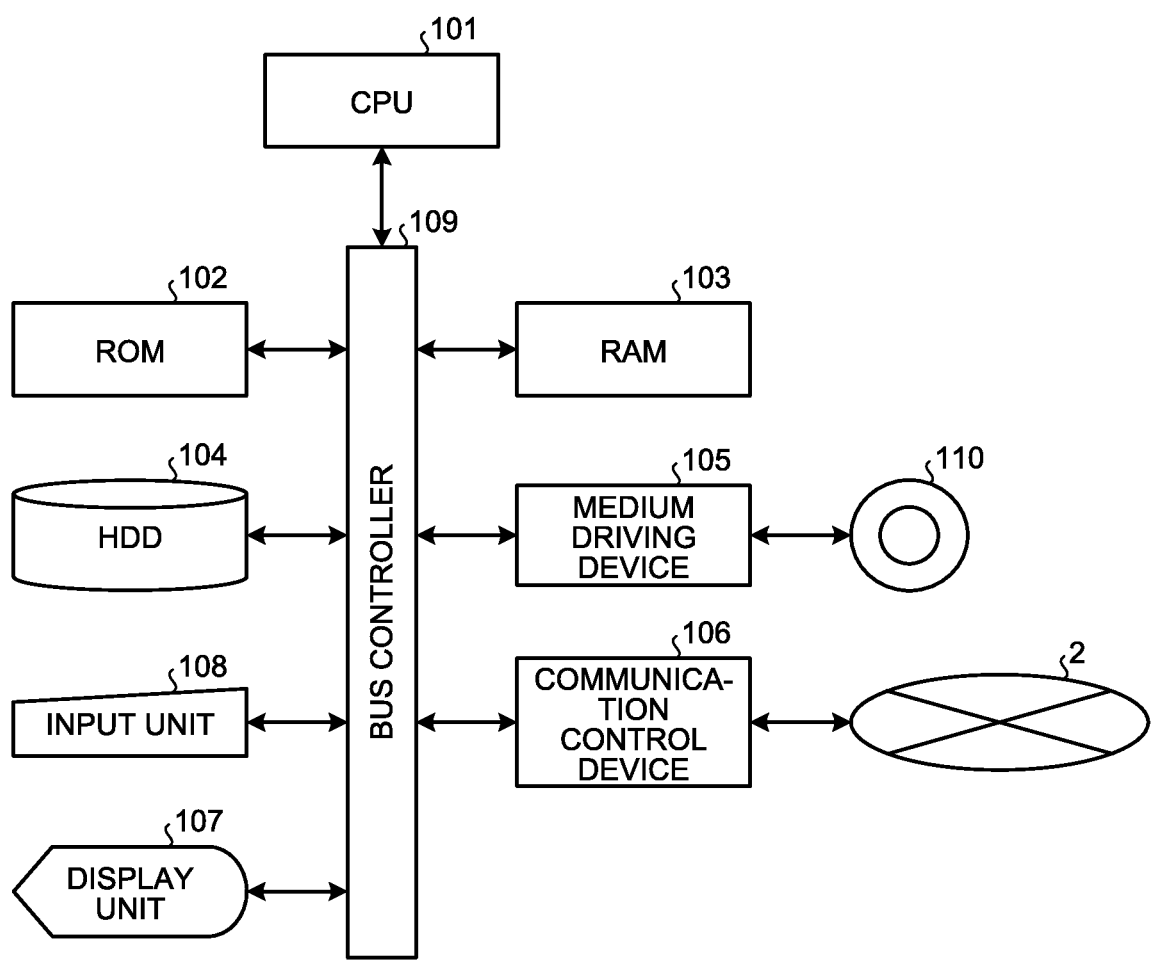
FIG. 2 is a block diagram illustrating an example of each of the hardware configurations of a server and a sensor terminal.

FIG. 2 is a block diagram illustrating an example of each of the hardware configurations of the server 1 and the sensor terminal 3 according to this embodiment. Each of the server 1 and the sensor terminal 3 has, for example, a hardware configuration for which a general-purpose computer is used. That is, each of the server 1 and the sensor terminal 3 includes: a central processing unit (CPU) 101 that processes information; a read only memory (ROM) 102 that is a read only memory storing thereon a basic input/output system (BIOS); a random access memory (RAM) 103 that stores therein various kinds of data in a rewritable manner; a hard disk drive (HDD) 104 that functions as various kinds of database and stores therein various programs; a medium driving device 105 such as a CD-ROM drive for saving information, distributing information to the outside, or obtaining information from the outside using a recording medium 110; a communication control device 106 for delivering information through communication with another outside computer through the network 2; a display unit 107 such as a cathode ray tube (CRT) or a liquid crystal display (LCD) that displays the progress, the result, and the like of processing to a user; and an input unit 108 composed of a keyboard, a mouse, and the like that is used by the user for inputting instructions, information, and the like. Each of the server 1 and the sensor terminal 3 operates with a bus controller 109 intermediating data transmitted and received between these units.

In each of the server 1 and the sensor terminal 3, when a user turns the power thereof on, the CPU 101 starts up a computer program called a loader within the ROM 102, loads a computer program called an operating system (OS) from the HDD 104 onto the RAM 103, and starts up this OS. The computer program called an OS is a computer program that manages hardware and software of a computer. The OS starts up a computer program and reads and saves information in response to user operations. As representative examples of the OS, Windows (registered trademark) and UNIX (registered trademark) are known. A computer program that runs on such an OS is called an application program. An application program is not limited to one that run on a certain OS, and may be one configured to cause the OS to alternatively execute a part of various processes to be described later or may be one included as a part of a group of program files constituting certain application software or the OS.

Here, the server 1 stores thereon a sensor data management program as an application program in the HDD 104. In this sense, the HDD 104 functions as a storage medium that stores therein the sensor data management program. In general, an application program to be installed on the HDD 104 in the server 1 is provided by being recorded on the recording medium 110 that is, for example, a media among various optical discs such as a compact disc read-only memory (CD-ROM) and a digital versatile disc (DVD), various magneto-optical discs, various magnetic disks such as a flexible disk, and medium of various schemes such as a semiconductor memory. Therefore, the recording medium 110 that is portable such as an optical information recording medium, such as a CD-ROM, or a magnetic media, such as an FD, can also be a storage medium that stores the sensor data management program. The sensor data management program may alternatively be introduced from the outside via the communication control device 106 and installed on the HDD 104, for example.

In the server 1, when the sensor data management program that runs on the OS is started up, the CPU 101 centrally controls the individual units by executing various kinds of arithmetic processing in accordance with the sensor data management program. In the sensor terminal 3, when an application program that runs on the OS is started up, the CPU 101 centrally controls the individual units by executing various kinds of arithmetic processing in accordance with this application program. The following describes parts of the various kinds of arithmetic processing that the CPUs 101 in the server 1 and the sensor terminal 3 execute, the parts being characteristic in the sensor data management system according to this embodiment.

Figure 3:
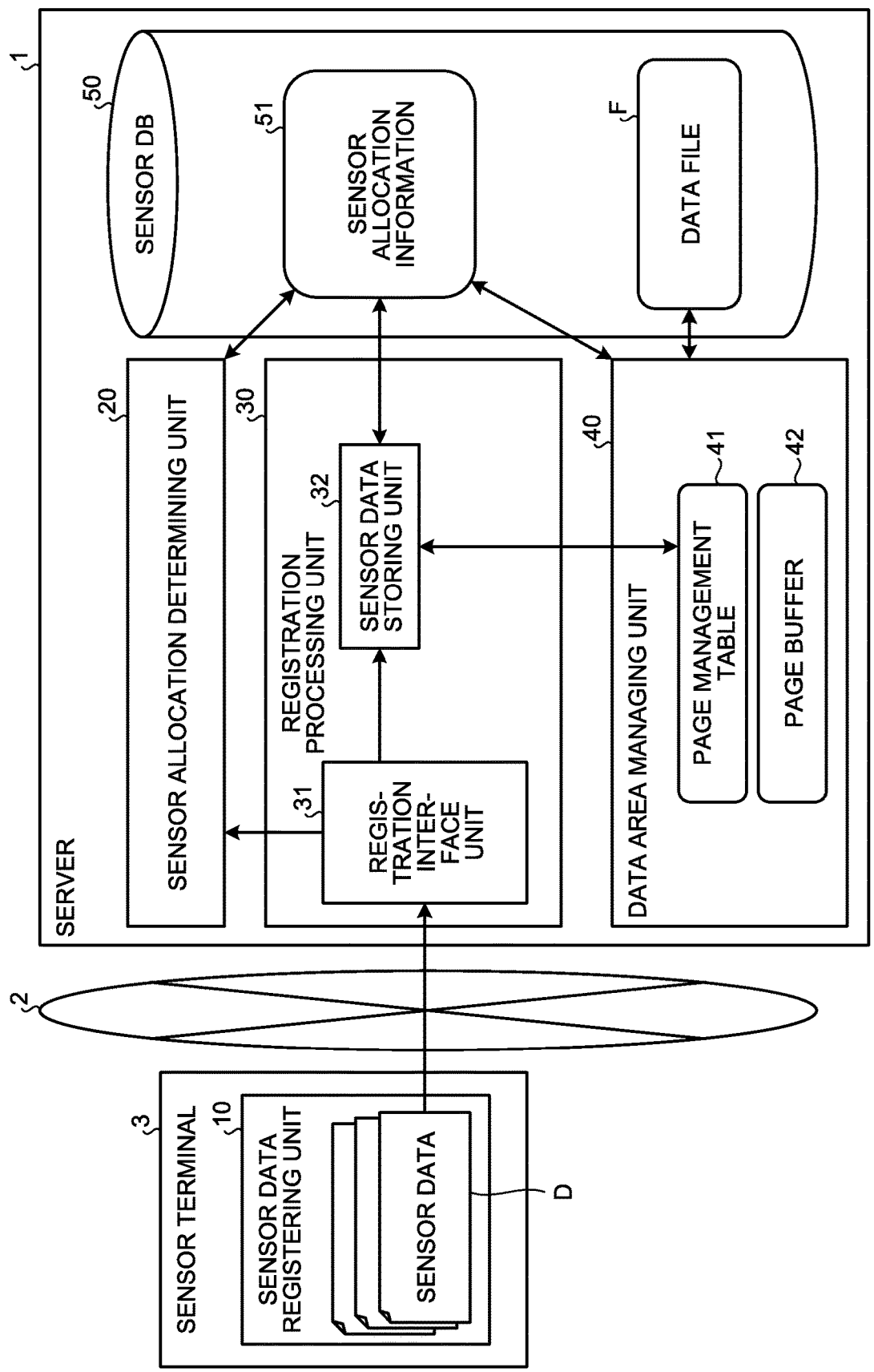
FIG. 3 is a block diagram illustrating an example of the functional configurations of the server and the sensor terminal.

FIG. 3 is a block diagram illustrating an example of the functional configurations of the server 1 and the sensor terminal 3 according to this embodiment. As illustrated in FIG. 3, the sensor terminal 3 includes a sensor data registering unit 10 as a functional constituent element that is implemented by an application program.

The sensor data registering unit 10 is used for registering, in a sensor database (sensor DB) 50 in the server 1, sensor data input from the input unit 108 and sensor data previously stored in the HDD 104 in the sensor terminal 3. This sensor data registering unit 10 also transmits a registration request to the server 1 at the same time as transmitting thereto sensor data needed to be registered.

Figure 4:
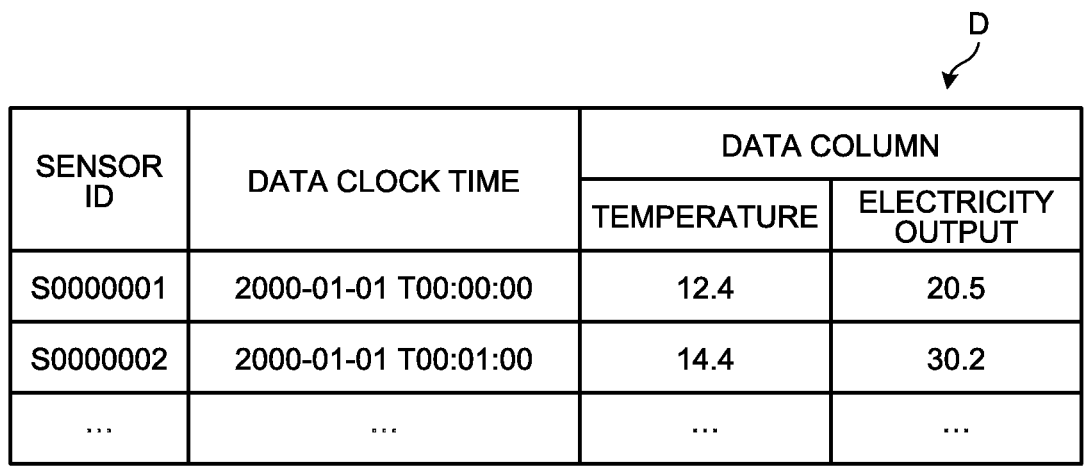
FIG. 4 is a diagram illustrating an example of sensor data.

FIG. 4 is a diagram illustrating an example of sensor data D that the sensor data registering unit 10 transmits to the server 1. The sensor data D consists of sensor IDs for identifying sensors, data clock times (clock time information) indicating the clock times of pieces of sensor data to be registered, and data columns each including specific values detected by the sensors. In the example illustrated as the sensor data D in FIG. 4, the data columns contain values indicating temperatures and values indicating power generation amounts. This is merely an example. The attribute and values of data contained in a data column vary depending on kinds of sensor. When one of the sensor terminals 3 transmits values detected by a plurality of sensors to the server 1, the sensor data D with different sensors ID is transmitted.

The data clock times in the sensor data D are used as indicators based on which it is determined whether the sensor data D transmitted from any one of the sensor terminals 3 in a time sequence is treated as data to be newly registered (data acquired at the next clock time) or data to be used for updating the already registered data (data acquired at the same clock time). That is, when transmitting updated data for the sensor data D that has already been registered in the sensor DB 50 to the server 1, the sensor terminal 3 transmits, as the sensor data D, the sensor data D that has the same data clock time as that of the sensor data D that has already been registered. If there is sensor data D already registered that has the same data clock time as the data clock time of the received sensor data D, the server 1 updates values in the data columns in the already registered sensor data D with values in the data columns in the newly received sensor data D. In contrast, if there is no sensor data D that has the same data clock time as the data clock time of the received sensor data D, the server 1 newly registers the received sensor data D.

The server 1 also includes a registration processing unit 30, a sensor allocation determining unit 20 (an example of the "group determining unit"), and a data area managing unit 40 (an example of a "data area managing unit") as functional constituent elements that are implemented by the sensor data management program. The server 1 further includes the sensor DB 50 for which a storage device (a disk) such as the HDD 104 is used. The server 1 still further includes a page management table 41 and a page buffer 42 for which a storage device (a memory) such as the RAM 103 is used.

Upon receiving the registration request from the sensor terminal 3, the registration processing unit 30 performs processing for registering, in the sensor DB 50, the sensor data D transmitted from the sensor terminal 3. This registration processing unit 30 includes a registration interface unit 31 and a sensor data storing unit 32 (an example of the "data storing unit").

The registration interface unit 31 receives input of sensor data D and calls the sensor data storing unit 32 to register the received sensor data D in the sensor DB 50. The registration interface unit 31 notifies the sensor allocation determining unit 20 of a time (a clock time) at which the input of the sensor data D has been received, as an arrival clock time T. This arrival clock time T is stored by the sensor allocation determining unit 20.

The sensor data storing unit 32 performs processing for: using sensor allocation information 51 that the sensor allocation determining unit 20 generates, updates, and manages, determining a storage location for sensor data D the input of which has been received by the registration interface unit 31; and storing the sensor data D at the storage location. The sensor allocation information 51 is contained together with a data file F in the sensor DB 50, for example. Details of the sensor allocation information 51 are to be described later.

Figure 5:
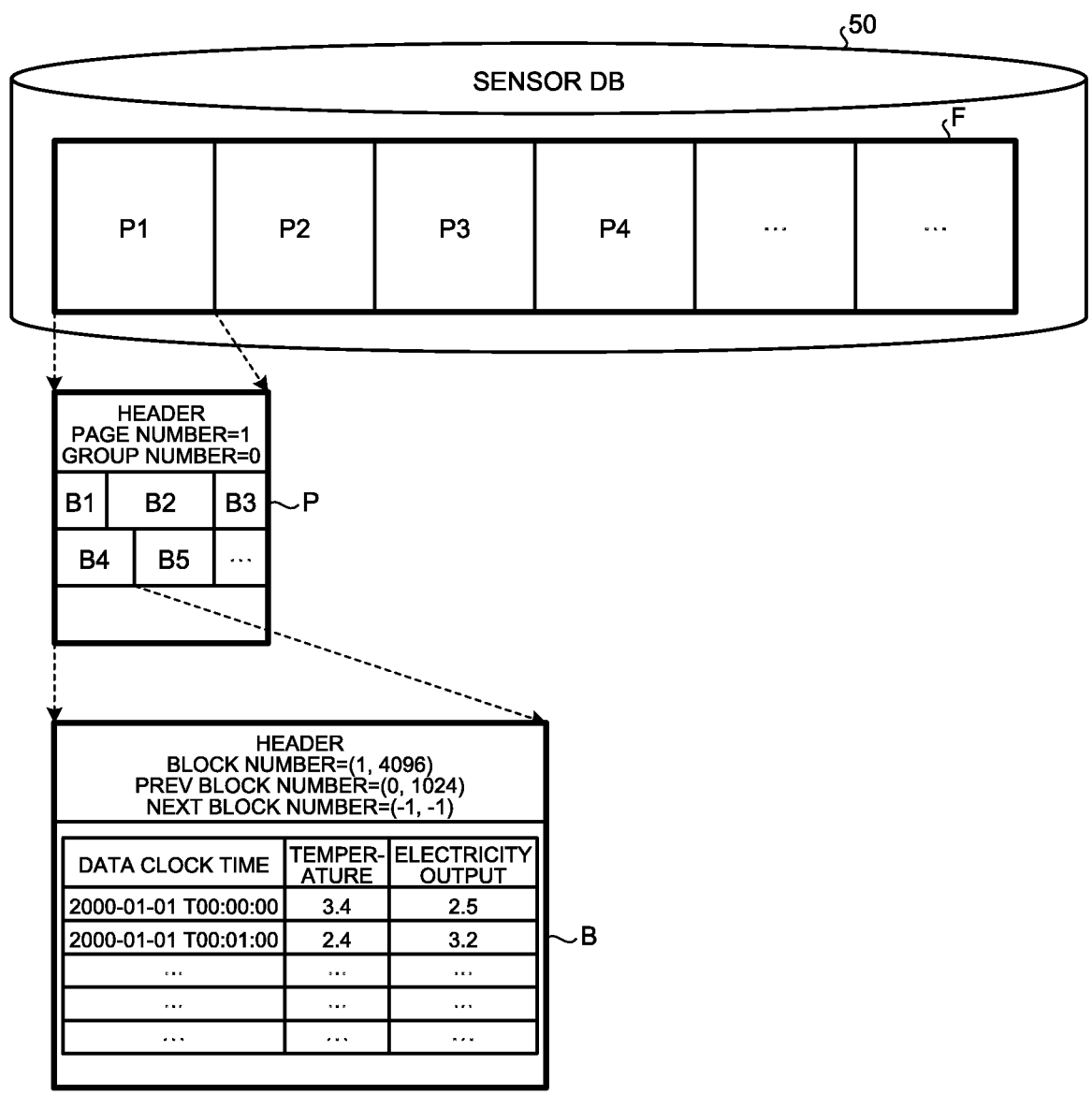
FIG. 5 is a diagram illustrating an exemplary configuration of a data file.

FIG. 5 is a diagram illustrating an exemplary configuration of the data file F contained in the sensor DB 50. The data file F is used for permanently managing sensor data and is set up as a set of data areas of the same size each called a page P. Allocation to pages P is managed by the data area managing unit 40 based on the page management table 41.

The pages P are units in which data is read and written between the data file F and the page buffer 42 that is on the memory, and sensor data D acquired from a plurality of sensors are stored on the same one of the pages P. Each of the pages P is sectioned into a header area and a data area. The header area contains a page number and a group number. The page number uniquely indicates the corresponding page P. The group number uniquely indicates a group consisting of a cluster of sensors allocated to the corresponding page P by the sensor allocation determining unit 20. The data area is composed of a plurality of blocks B in each of which sensor data D is stored, and one sensor is allocated to one of the blocks B. A cluster of sensors from which data is stored on each one of the pages P consists only of sensors having the same group number. That is, each one of the pages P is a set of the blocks B in which data from corresponding sensors belonging to the same group is stored.

Each of the blocks B is an area in which only data relevant to one sensor is stored. Data to be stored in each of the blocks B is data clock times and data columns contained in sensor data D. Hereinafter, a piece of sensor data D corresponding to each data clock time that has been registered in any one of the blocks B is referred to as a piece of registration data.

Each of the blocks B is sectioned into a header area and a data area. The header area contains a block number, a PREV block number, and a NEXT block number. The block number uniquely indicates the corresponding block B. The PREV block number indicates a block number of the block B in which pieces of registration data having earlier data clock times than registration data within this corresponding block B. The NEXT block number indicates a block number of the block B in which pieces of registration data having later data clock times than registration data within this corresponding block B. When there are no such blocks, previously determined values such as (−1, −1) are recorded as the PREV block number and the NEXT block number. In the data area, pieces of registration data that correspond to a plurality of data clock times are stored. The block B illustrated in FIG. 5 is an example of the block B in which pieces of registration data from a certain sensor are stored; and pieces of data (temperatures and power generation amounts) acquired at a plurality of data clock times are stored therein in chronological order.

Figures 6, 7:
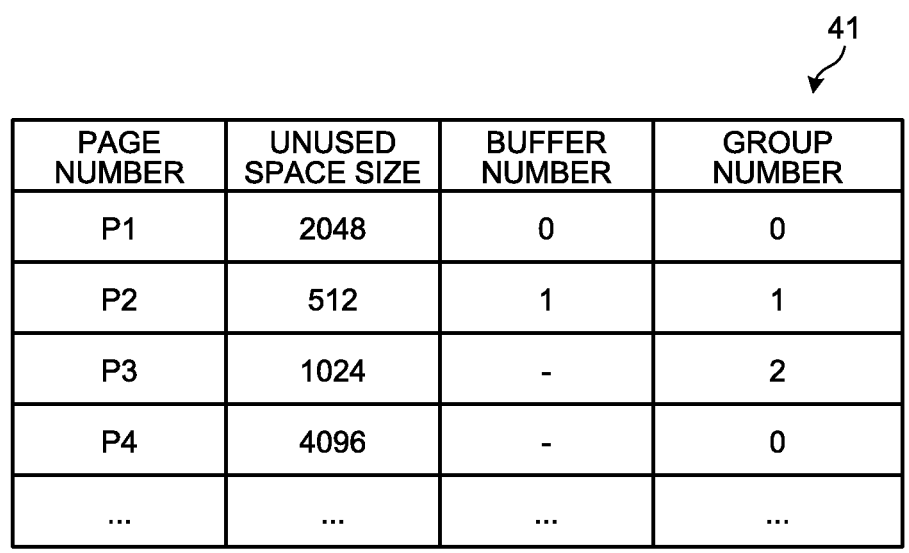
FIG. 6 is a diagram illustrating an example of a block number.
FIG. 7 is a diagram illustrating an example of a page management table.

FIG. 6 is a diagram illustrating an example of the block number. The block number is represented as, for example, a combination of the page number of the page P to which the corresponding block B belongs and an in-page offset indicating a position of the block B within that page P, as illustrated in FIG. 6. A location at which data in that block B is in the data file F can be identified with this block number.

FIG. 7 is a diagram illustrating an example of a page management table 41 that the data area managing unit 40 uses for managing allocation of the pages P. The page management table 41 is represented as a table in which the respective pages P allocated on the data file F serve as records, for example, as illustrated in FIG. 7, each of the records consists of a page number, unused space size, a buffer number, and a group number. The page number is the page number of the page P that corresponds to each of the records. The unused space size is the size of the unused area within the page P. The buffer number is an ID that specifies a buffer retaining a copy of the page P when the copy of the page P is found on the page buffer 42. The group number is the group number of a cluster of sensors from which registration data is stored in the page P that corresponds to each of the records.

FIG. 8 is a diagram illustrating an example of the page buffer 42. The page buffer 42 is secured in an area on the memory, and retains a copy of a part of a cluster of pages allocated on the data file F. Sensor data D input from the sensor terminal 3 is temporarily retained by this page buffer 42 and written out with respect to each of the pages P into the data file F in the sensor DB 50 at an arbitrary timing.

The page buffer 42 retains a plurality of combinations each consisting of the buffer number, a last access clock time, and page data, for example, as illustrated in FIG. 8. The buffer number uniquely specifies a buffer retaining a copy of each of the pages P. The last access clock time is a clock time of the last access to data in the buffer, and serves as a reference when data is output from the buffer. The page data is data obtained by copying the page P on the data file F. When new registration of sensor data D or update of data has occurred, the page data on the page buffer 42 may sometimes be temporarily partly different from the page P on the data file F.

FIG. 9 is a diagram illustrating an example of the sensor allocation information 51 generated, updated, and managed by the sensor allocation determining unit 20. The sensor allocation information 51 is set up as a hash table in which the sensor IDs serve as keys, for example, as illustrated in FIG. 9. Each of the records consists of a sensor ID, an end data block number, a registration interval, an arrival time, an update frequency, a last update clock time, and a group number.

The sensor ID is the sensor ID of a sensor corresponding to each of the records. The end data block number indicates the block number of the block B in which a piece of registration data has been stored that has the latest data clock time among all pieces of registration data from sensors identified with the sensor IDs. The end data block number is used for quickly accessing data having the latest clock time.

The registration interval, the arrival time, and the update frequency are data that the sensor allocation determining unit 20 uses as a reference for grouping a cluster of sensors when performing sensor allocation determination processing, and are obtained by analyzing stored sensor data D (an example of the "analysis result"). That is, the registration interval indicates a time interval between times when sensor data D input from one sensor is registered. The registration interval is calculated, for example, based on the difference between two data clock times when different sensor data D input from the same sensor is registered. The arrival time indicates an approximate timing when sensor data D to be registered at the registration interval is to be transmitted from the sensor terminal 3 to the server 1. The arrival time is calculated based on the difference between a data clock time included in sensor data D that is input and an arrival clock time T that is a clock time when the sensor data D has been input. Specifically, if the difference between the data clock time included in the input piece of sensor data D and the arrival clock time T that is a clock time when the sensor data D has been input is smaller than the registration interval, this difference is set as the arrival time. To the contrary, if the difference between the data clock time included in the input sensor data D and the arrival clock time T that is a clock time when the sensor data D has been input is larger than the registration interval, a value obtained as the remainder of dividing this difference by the registration interval is set as the arrival time. The update frequency indicates how frequently input sensor data D is updated within the registration interval. The update frequency is calculated, for example, based on the difference between the arrival clock times T of two pieces of sensor data input from the same sensor that include the same data clock time.

The last update clock time is a clock time of the last input of sensor data D from a sensor corresponding to each of the records to the server 1 (the latest arrival clock time T). The last update clock time is updated by the sensor allocation determining unit 20 every time newly input sensor data D is stored. At this time, if any change occurs to, for example, the registration interval, the arrival time, and the update frequency, the values thereof are also updated by the sensor allocation determining unit 20.

The group number is the group number of a group to which a sensor that corresponds to each of the records belongs. A group to which each of the sensors should belong is determined in a manner such that the sensor allocation determining unit 20 performs sensor allocation determination processing at previously determined certain timings to divide a cluster of sensors into groups based on, for example, the registration intervals, the arrival times, and the update frequencies.

The sensor allocation determining unit 20 obtains, for example, the registration interval, the arrival time, and the update frequency with respect to each sensor by analyzing the stored sensor data D in the above-described manner, and records them in the sensor allocation information 51. The sensor allocation determining unit 20 then executes the sensor allocation determination processing at certain timings to divide the cluster of sensors into groups based on, for example, the registration intervals, the arrival times, and the update frequencies, and then records the group numbers of the groups to which the respective sensors belong in the sensor allocation information 51.

Referring back to FIG. 3, the sensor data storing unit 32 determines storage locations of the sensor data D (the block B in which each piece of sensor data needs to be stored), based on the sensor IDs extracted from the sensor data D the input of which has been received by the registration interface unit 31 and the end data block numbers recorded in the sensor allocation information 51. The sensor data storing unit 32 stores the input sensor data D in the determined storage location if there is an unused area in which the sensor data D can be stored. To the contrary, if there is not such an unused area, the sensor data storing unit 32 calls the data area managing unit 40 and stores the input sensor data D in an area secured by the data area managing unit 40.

The data area managing unit 40 determines, based on the group numbers in the sensor allocation information 51 and information in the page management table 41, whether there is an unused area on the page P that includes the storage location of the sensor data D as determined by the sensor data storing unit 32. If there is an unused area on that page P, the data area managing unit 40 returns the unused area on that page P as a storage area for the sensor data D to the sensor data storing unit 32. To the contrary, if there is no unused area on that page P, the data area managing unit 40 newly generates a page P and returns an unused area on that newly generated page P as a storage area for the sensor data D to the sensor data storing unit 32.

Next, the operation of the server 1 configured as above is described. The operation of the server 1 includes the data storage processing to be executed every time when sensor data D is transmitted from the sensor terminal 3 through the network 2, and the sensor allocation determination processing to be executed at previously determined certain timings. First, an example of the data storage processing is described with reference to FIG. 10 to FIG. 12.

Figure 10:
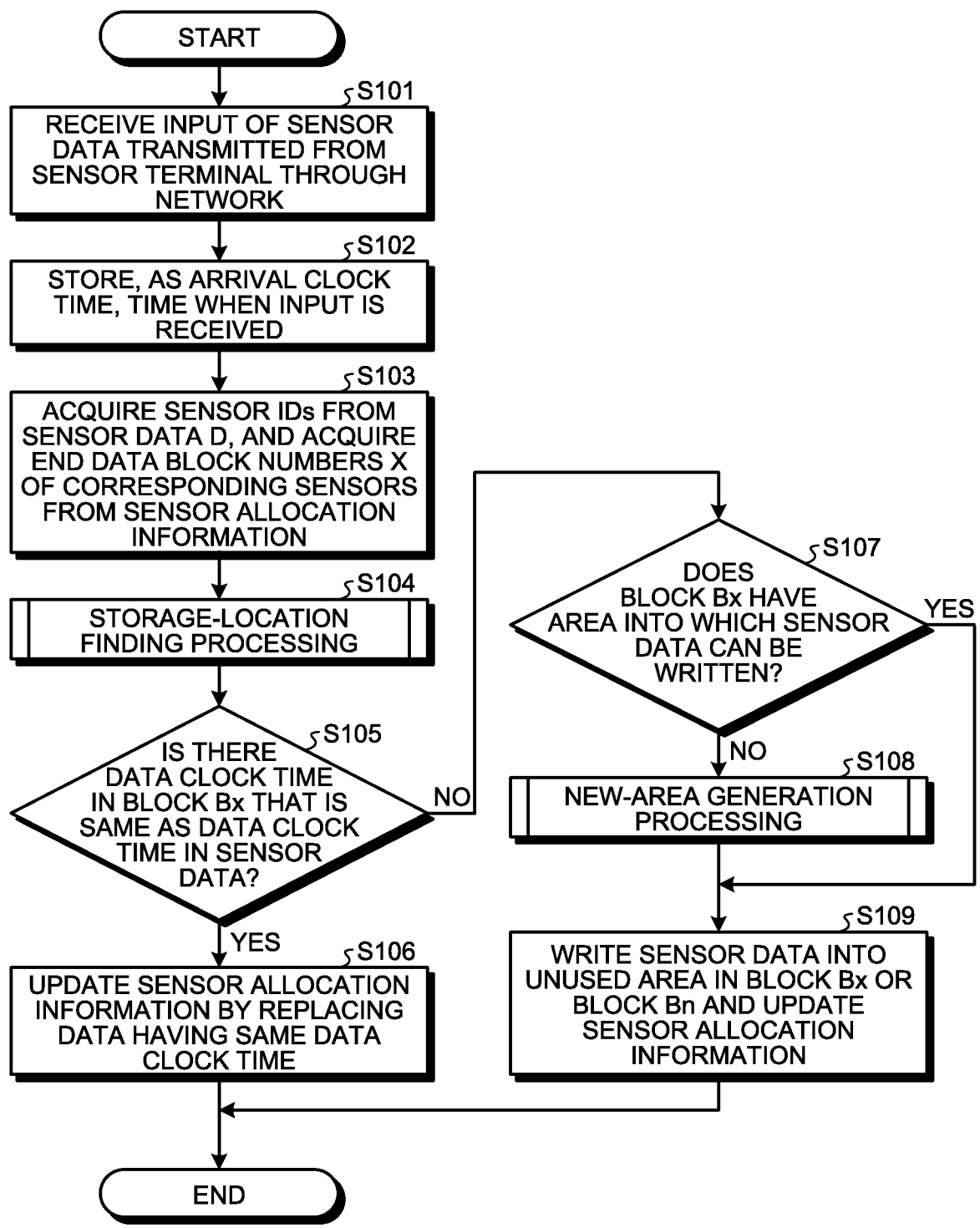
FIG. 10 is a flowchart illustrating an example of the procedure of data storage processing.

FIG. 10 is a flowchart illustrating an example of the procedure of the data storage processing. At the start of the data storage processing, the registration interface unit 31 receives input of sensor data D transmitted from the sensor terminal 3 through the network 2 (Step S101). The sensor allocation determining unit 20 then stores, as an arrival clock time T, the time when the registration interface unit 31 has received the input of the sensor data D (Step S102).

Subsequently, the sensor data storing unit 32 acquires sensor IDs from the sensor data D input at Step S101, and acquires the end data block numbers X of corresponding sensors from the sensor allocation information 51 (Step S103).

Subsequently, using the end data block numbers X acquired at Step S103, the sensor data storing unit 32 executes storage-location search processing in which to find locations at which the sensor data D input at Step S101 is input (Step S104).

Figure 11:
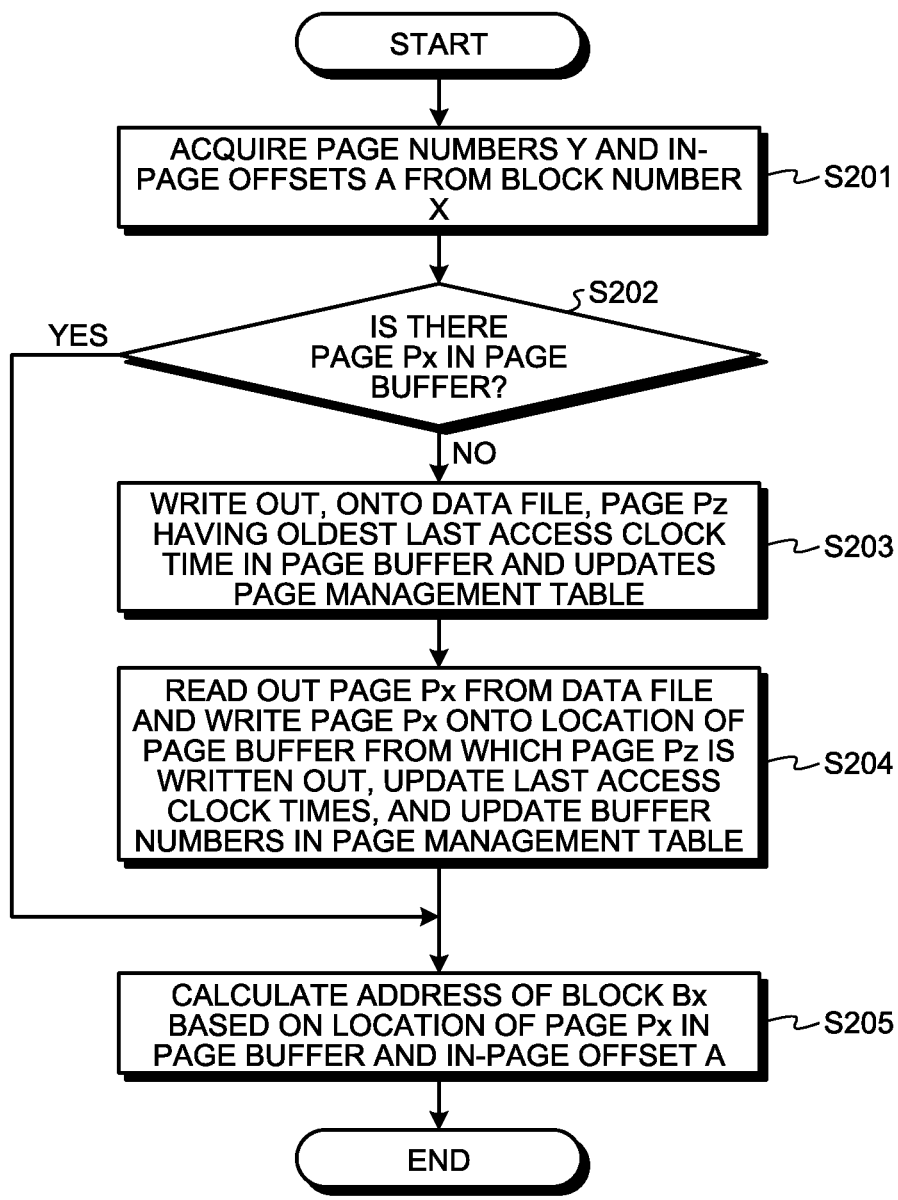
FIG. 11 is a flowchart illustrating an example of the procedure of storage-location finding processing.

FIG. 11 is a flowchart illustrating an example of the procedure of the storage-location finding processing to be executed by the sensor data storing unit 32. At the start of the storage-location finding processing, the sensor data storing unit 32 acquires page numbers Y and in-page offsets A from the block numbers X (Step S201).

Subsequently, with reference to the page management table 41, the sensor data storing unit 32 confirms whether the pages Px indicated by the page numbers Y are found in the page buffer 42 (Step S202). If the page Px is found in the page buffer 42 (Yes at Step S202), the sensor data storing unit 32 calculates the address of the block Bx based on the location of the page Px in the page buffer 42 and the in-page offset A (Step S205), and ends the storage-location finding processing.

In contrast, if the page Px is not found in the page buffer 42 (No at Step S202), the sensor data storing unit 32 writes out the page Pz having the oldest last access clock time in the page buffer 42, onto the data file F, and updates the buffer numbers in the page management table 41 (Step S203). Subsequently, the sensor data storing unit 32 reads out the page Px from the data file F and writes the page Px read out from the data file F onto a location in the page buffer 42 from which the page Pz is written out at Step S203, thereby updating the last access clock times and updating the buffer numbers in the page management table 41 (Step S204). The sensor data storing unit 32 then calculates the address of the block Bx based on the location of the page Px in the page buffer 42 and the in-page offset A (Step S205) and ends the storage-location finding processing.

Referring back to FIG. 10, the sensor data storing unit 32 confirms whether, in the block Bx having the block number X that has been found in the storage-location finding processing at Step S104, there is the same data clock time as a data clock time in the sensor data D input at Step S101 (Step S105).

Here, if there is the same data clock time in the block Bx (Yes at Step S105), the sensor data storing unit 32 writes over data having the same data clock time in the block Bx. That is, the data having the same data clock time is updated with the sensor data D input at Step S101. The sensor allocation determining unit 20 then updates the sensor allocation information 51 (Step S106) and ends the data storage processing.

In this updating of the sensor allocation information 51, the registration intervals, the arrival times, the update frequencies, and the last update clock times are updated. That is, the sensor allocation determining unit 20 obtains the registration interval based on the difference between the data clock time in the sensor data D newly stored and the data clock time immediately prior thereto and updates the registration time if there is a change in the registration time. The sensor allocation determining unit 20 also obtains the arrival time based on the difference between the data clock time and the arrival clock time T in the sensor data D newly stored and updates the arrival time if there is a change in the arrival time. The sensor allocation determining unit 20 also obtains the update frequency based on the difference between the last update time recorded in the sensor allocation information 51 and the arrival clock time T and updates the update frequency if there is a change in the update frequency. Lastly, the sensor allocation determining unit 20 updates the last update clock time in the sensor allocation information 51 with the arrival clock time T.

In contrast, if no data clock time is the same as the data clock time of the sensor data D input at Step S101 in the block Bx (No at Step S105), the sensor data storing unit 32 confirms whether the block Bx has an unused area into which the sensor data D input at Step S101 can be written (Step S107). Here, if an unused area into which the sensor data D can be written exists in the block Bx (Yes at Step S107), the sensor data storing unit 32 writes the sensor data D into the unused area in this block Bx. The sensor allocation determining unit 20 then updates the sensor allocation information 51 (Step S109) and ends the data storage processing. The updating of the sensor allocation information 51 is the same as the updating at Step S106 described above.

In contrast, if no unused area is available in the block Bx for writing the sensor data D input at Step S101 (No at Step S107), the sensor data storing unit 32 calls the data area managing unit 40 and causes the data area managing unit 40 to execute new-area generation processing (Step S108).

Figure 12:
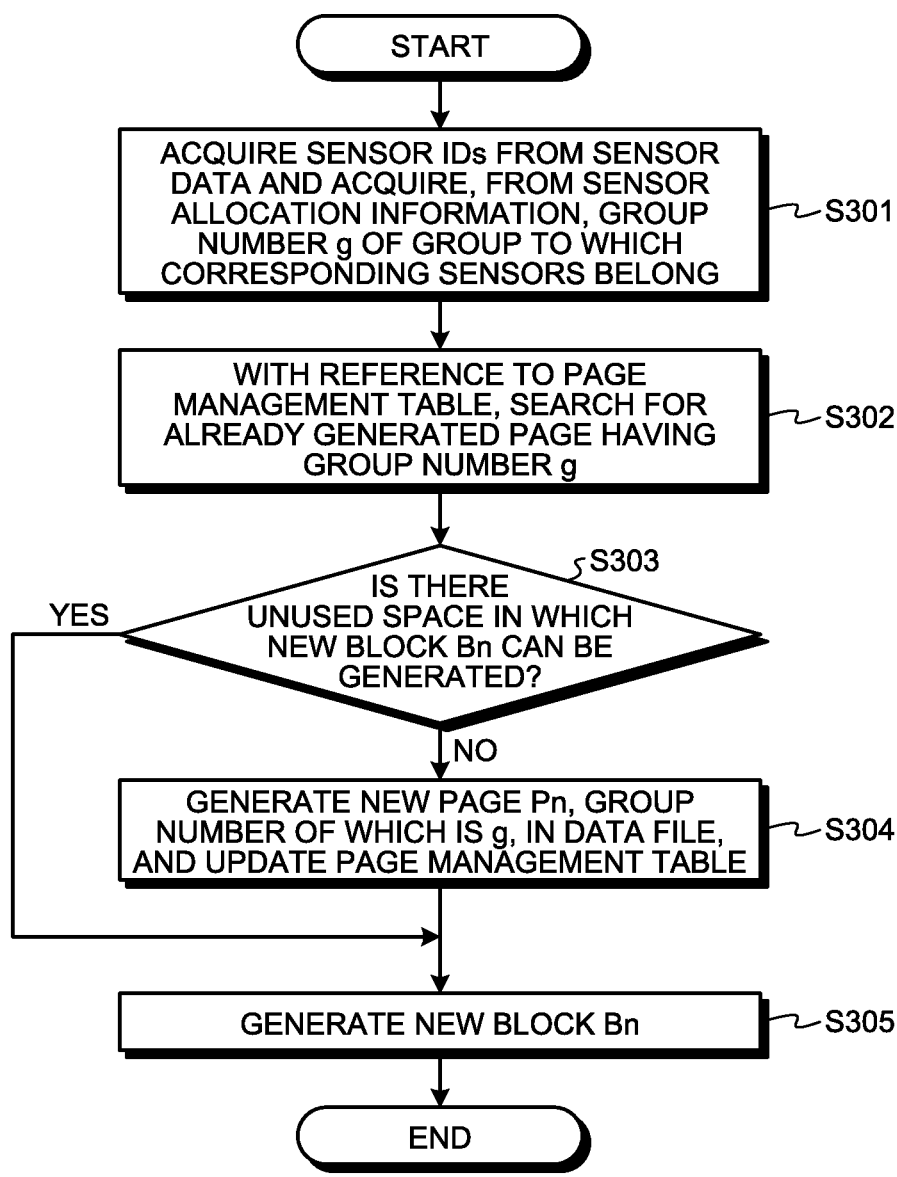
FIG. 12 is a flowchart illustrating an example of the procedure of new-area generation processing.

FIG. 12 is a flowchart illustrating an example of the procedure of new-area generation processing to be executed by the data area managing unit 40. At the start of the new-area generation processing, the data area managing unit 40 acquires sensor IDs from the sensor data D input at Step S101 and acquires, from the sensor allocation information 51, a group number g of a group to which sensors corresponding to the sensor IDs belong (Step S301).

Subsequently, with reference to the page management table 41, the data area managing unit 40 searches for a page already generated that has the group number g acquired at Step S301 (Step S302). The data area managing unit 40 confirms whether the already generated page acquired at Step S302 has an unused space in which a new block Bn can be generated (Step S303). Here, if the already generated page acquired at Step S302 has no unused space in which the new block Bn can be generated (No at Step S303), the data area managing unit 40 generates a new page Pn, the group number of which is g, in the data file F, and updates the page management table 41 (Step S304). At this step, the new page Pn is written into the page buffer 42 using the same procedure as the one at Step S203 and Step S204. The data area managing unit 40 then generates the new block Bn in the new page Pn generated at Step S304 (Step S305) and ends the new-area generation processing.

In contrast, if the already generated page acquired at Step S302 has an unused space in which the new block Bn can be generated (Yes at Step S303), the data area managing unit 40 generates the new block Bn in the already generated page (Step S305) and ends the new-area generation processing.

Referring back to FIG. 10, the sensor data storing unit 32 writes the sensor data D into the new block Bn generated through the new-area generation processing at Step S108.

The sensor allocation determining unit 20 then updates the sensor allocation information 51 (Step S109) and ends the data storage processing. The updating of the sensor allocation information 51 is the same as the updating at Step S106 described above.

Figure 13:
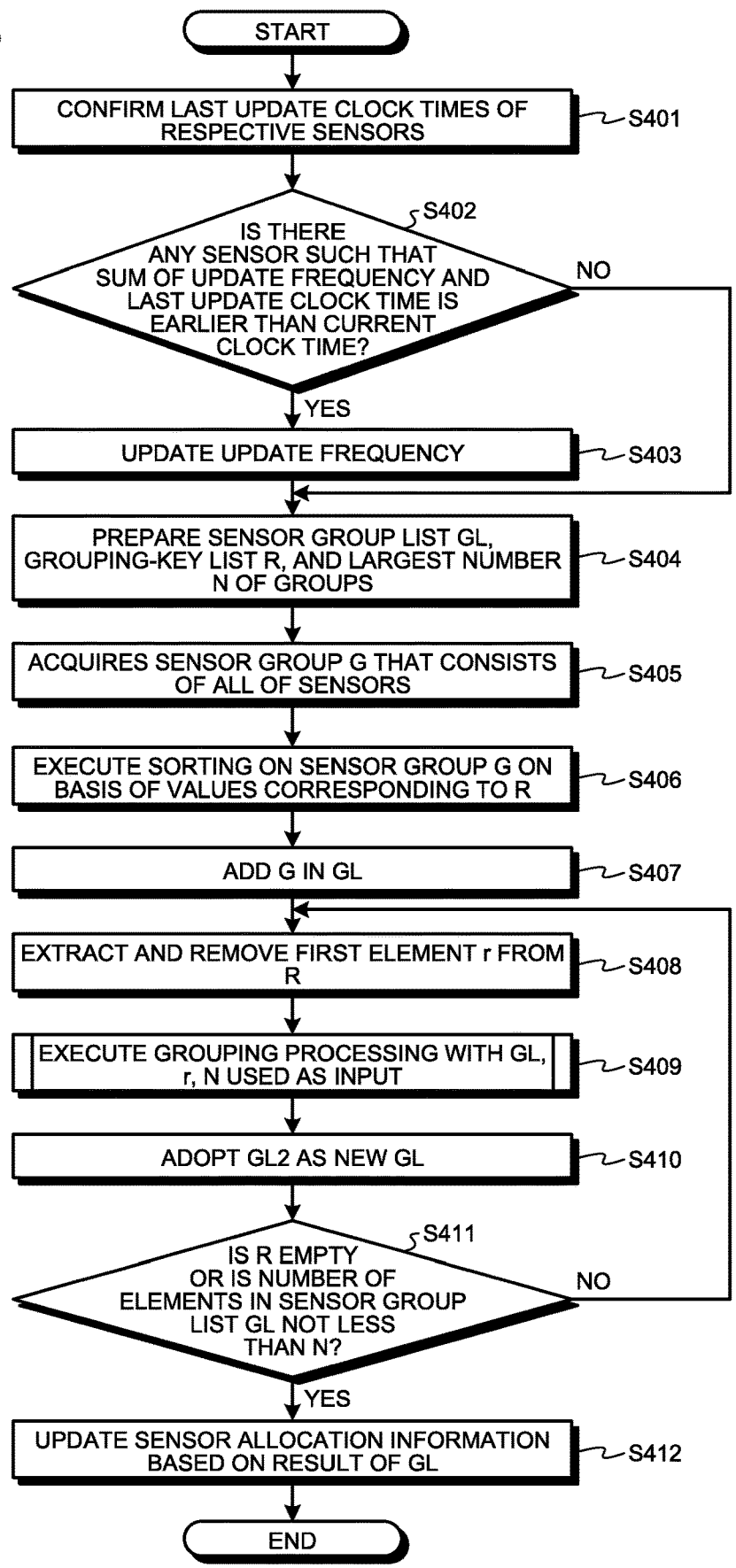
FIG. 13 is a flowchart illustrating an example of the procedure of sensor allocation determination processing.

Next, an example of the sensor allocation determination processing is described with reference to FIG. 13 and FIG. 14. FIG. 13 is a flowchart illustrating an example of the procedure of the sensor allocation determination processing. This sensor allocation information illustrated in FIG. 13 is executed at certain timings previously determined, for example, at regular time intervals by the sensor allocation determining unit 20. A grouping-key list to be described later is a list of data (keys) to be used as references for grouping a cluster of sensors, and it is assumed that registration intervals, arrival times, and update frequencies in the sensor allocation information 51 are provided in this order as three keys.

At the start of the sensor allocation determination processing, the sensor allocation determining unit 20 confirms the last update clock times of the respective sensors by referring to the sensor allocation information 51 (Step S401). The sensor allocation determining unit 20 confirms whether there is any sensor such that a clock time obtained by adding the update frequency thereof to the last update clock time thereof is earlier than the current clock time (Step S402). Here, if there is any sensor such that a clock time obtained by adding the update frequency thereof to the last update clock time thereof is earlier than the current clock time (Yes at Step S402), the sensor allocation determining unit 20 updates the update frequency of the sensor using the difference between the current clock time and the last update clock time (Step S403). In contrast, if there is no sensor such that a clock time obtained by adding the update frequency thereof to the last update clock time thereof is earlier than the current clock time (No at Step S402), the processing is shifted to the following steps.

Subsequently, the sensor allocation determining unit 20 prepares a sensor group list GL, a grouping-key list R, and the largest number N of groups (Step S404). The grouping-key list R is a list containing, as three keys, registration intervals, arrival times, and update frequencies included in the sensor allocation information 51 as described above. The largest number N of groups is given from a parameter set in the server 1.

Subsequently, the sensor allocation determining unit 20 acquires a sensor group G that consists of all of the sensors (Step S405). The sensor allocation determining unit 20 then executes sorting on the sensor group G acquired at Step S405 in ascending orders on the basis of values corresponding to the grouping-key list R (Step S406) and adds the sensor group G in the sensor group list GL (Step S407).

Subsequently, the sensor allocation determining unit 20 extracts and removes the first element (key) r from the grouping-key list R (Step S408). The sensor allocation determining unit 20 then executes grouping processing with the sensor group list GL, the key r, and the largest number N of groups used as input (Step S409).

Figure 14:
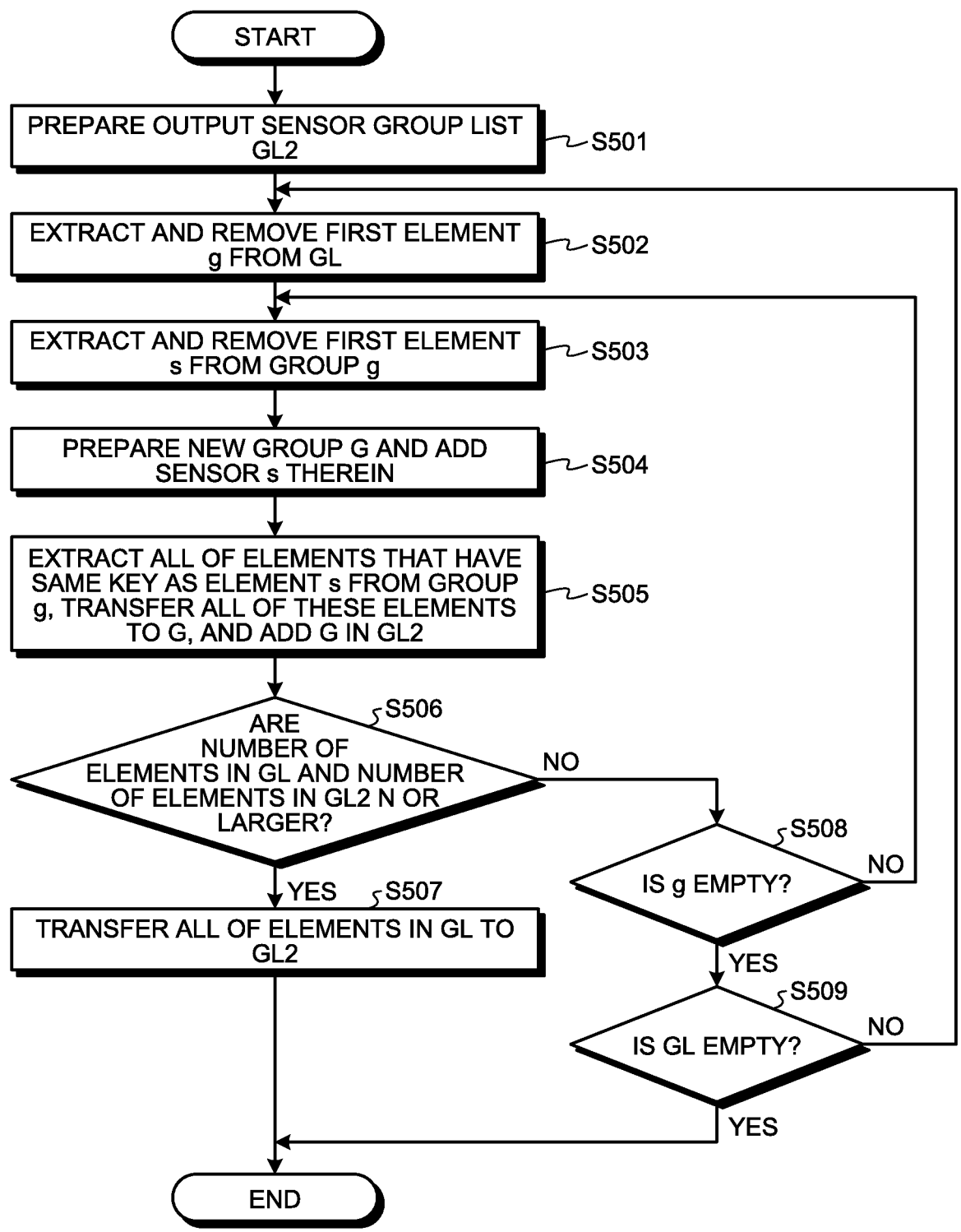
FIG. 14 is a flowchart illustrating an example of the procedure of grouping processing.

FIG. 14 is a flowchart illustrating an example of the procedure of the grouping processing to be executed by the sensor allocation determining unit 20. At the start of the grouping processing, the sensor allocation determining unit 20 prepares an output sensor group list GL2 (Step S501).

Subsequently, the sensor allocation determining unit 20 extracts and removes the first element (a group) g from the sensor group list GL (Step S502).

Subsequently, the sensor allocation determining unit 20 extracts and removes the first element (a sensor) s from the group g extracted from the sensor group list GL at Step S502 (Step S503).

Subsequently, the sensor allocation determining unit 20 prepares a new group G and adds a sensor s in the new group G, the sensor s being the sensor extracted from the group g at Step S503 (Step S504).

Subsequently, the sensor allocation determining unit 20 extracts, from the group g, all of the elements (sensors) that have the same key r as the sensor s does, transfers all of these elements to the new group G, and adds the new group G in the output sensor group list GL2 (Step S505).

Subsequently, the sensor allocation determining unit 20 confirms whether the number of elements in the sensor group list GL and the number of elements in the output sensor group list GL2 are N or larger (Step S506). Here, if the number of elements in the sensor group list and the number of elements in the output sensor group list GL2 are both N or larger (Yes at Step S506), the sensor allocation determining unit 20 transfers all of the elements in the sensor group list GL to the output sensor group list GL2 (Step S507) and outputs the output sensor group list GL2, thereby ending the grouping processing.

In contrast, if at least one of the number of elements in the sensor group list GL and the number of elements in the output sensor group list GL2 is less than N (No at Step S506), the sensor allocation determining unit 20 confirms whether the group g extracted from the sensor group list GL at Step S502 is then empty (Step S508). If the group g is not empty (No at Step S508), the processing is returned to Step S503 and continued.

In contrast, if the group g is empty (Yes at Step S508), the sensor allocation determining unit 20 confirms whether the sensor group list GL is empty (Step S509). If the sensor group list GL is not empty (No at Step S509), the processing is returned to Step S502 and continued.

In contrast, if the sensor group list GL is empty (Yes at Step S509), the sensor allocation determining unit 20 outputs the output sensor group list GL2 and ends the grouping processing.

Referring back to FIG. 13, the sensor allocation determining unit 20 adopts, as a new sensor group list GL, the output sensor group list GL2 outputted as a result of the grouping processing at Step S409 (Step S410). The sensor allocation determining unit 20 then confirms whether either of the following conditions is true: the grouping-key list R is empty; and the number of elements in the sensor group list GL is not less than the largest number N of groups (Step S411).

Here, if the number of elements in the sensor group list GL is less than the largest number N of groups while the grouping-key list R is not empty (No at Step S411), the processing is returned to Step S408 and continued. In contrast, if the grouping-key list R is empty or the number of elements in the sensor group list GL is not less than the largest number N of groups (Yes at Step S411), the sensor allocation determining unit 20 updates the group numbers in the sensor allocation information 51 based on the sensor group list GL (Step S412) and ends the sensor allocation determination processing.

In this embodiment, as described above, the sensor allocation determination processing is executed at certain timings in the server 1, which enables grouping of a cluster of sensors to be dynamically changed. Here, how the grouping has been actually changed is described with reference to a specific example of the sensor allocation information 51.

FIG. 15 is a diagram illustrating an example of the sensor allocation information 51 at a certain clock time. In this example of FIG. 15, the cluster of sensors has been grouped into four groups. That is, the cluster of sensors is first divided into two groups of S1 to S8 and of S9 to S16 on the basis of the difference in the registration intervals; the group of S1 to S8 is further divided into groups of S1 to S4 and of S5 to S8 on the basis of the differences in the arrival clock times; and the group of S9 to S16 is further divided into groups of S9 to S12 and S13 to S16 on the basis of the difference in the update frequencies. The cluster of sensors is thus divided into four groups finally.

FIG. 16 is a diagram illustrating the state of the sensor allocation information 51 after the elapse of a certain time period from FIG. 15. In the example of FIG. 16, there has been no update of data since 18:00 for the sensors that have the sensor IDs S3, S4, S7, and S8. As a result of executing the sensor allocation determination processing at this timing, the group of S1 to S4 is grouped into a group of S1 and S2 and a group of S3 and S4 while the group of S5 to S8 is grouped into a group of S5 and S6 and a group of S7 and S8, as illustrated in FIG. 16. For example, in the case of sensors for which data update cycles change, for example, because data is updated only during the daytime, the grouping may be changed over time.

As described above in detail with reference to the specific example, the server 1 that stores and manages sensor data D analyzes the stored sensor data D, groups a cluster of sensors based on the analysis result, and determines the storage locations of input sensor data D to store the sensor data D of sensors that are grouped into the same group in the block B on the same page P, in this embodiment. Consequently, according to this embodiment, while the amount of data is reduced by managing sensor data D on a sensor-to-sensor basis, pieces of data that are accessed at around the same time can be placed near to one another. Thus, the sensor data D can be stored and managed efficiently.

According to this embodiment, information needed for grouping the cluster of sensors is obtained by analyzing sensor data D stored in the server 1. Therefore, the application side does not need to define in advance information on sensors and relations between the sensors. In particular, information such as the registration intervals, the arrival times, and the update frequencies possibly change over time, and it is therefore difficult to have all of such information defined on the application side in advance. In contrast, in this embodiment, such information is obtained as a result of analyzing sensor data D stored in the server 1. Consequently, a cluster of sensors is optimally grouped in a manner suited to actual input conditions of sensor data D, which makes it possible to efficiently store and manage sensor data D.

In the above-described embodiment, the sensor allocation information 51 is configured to have columns for sensor IDs, end data block numbers, registration intervals, update frequencies, arrival times, and last update clock times, and group numbers. This example is, however, not limiting. For example, other information may be used such as: the number of columns of sensor data D; the data type thereof; a registration pattern such that, for example, data is registered only on weekdays or during the daytime; information on data retention duration that is prepared for deleting data from the sensor DB 50 after a certain time period; and grouping information provided by a client.

In the above-described embodiment, when grouping is performed on a cluster of sensors, the priority is determined in order of the registration intervals, the update frequencies, and the arrival times. This example is, however, not limiting. For example, the priority order may be changed or another mechanism may be employed in which: feature quantities that serve as one type of reference values are calculated using all of these pieces of information as parameters; and grouping is performed on the cluster of sensors based on the feature quantities. Any desired information included in the sensor allocation information 51 may be used when grouping is performed on a cluster of sensors.

In the above-described embodiment, when grouping is performed on a cluster of sensors, the granularities of the registration intervals, the update frequencies, and the arrival times are set to a second. This example is, however, not limiting. For example, when an extremely large number of groups are obtained with the granularities set to a second, the granularities may alternatively be set to a day, an hour, a minute, or the like.

In the above-described embodiment, the sensor allocation determination processing that includes grouping on a cluster of sensors is performed at fixed time intervals. This example is, however, not limiting. For example, the sensor allocation determination processing may be performed by being triggered by another piece of information such as the occurrence of an event where an increase or decrease of a file size or the number of registered sensors has reached a certain value.

In the above-described embodiment, information to be used in grouping on a cluster of sensors is all determined in the server 1. This example is, however, not limiting. For example, information provided by a client may be used as information such as the registration intervals or the update frequencies.

In the above-described embodiment, when the sensor allocation information 51 is updated, a registration interval is obtained based on the difference between a data clock time in newly stored sensor data D and a data clock time immediately prior thereto, an arrival time is obtained based on the difference between a data clock time in the newly stored sensor data D and an arrival clock time T, and an update frequency is obtained based on the difference between a last update clock time recorded in the sensor allocation information 51 and the arrival clock time T. This example is, however, not limiting. For example, the registration interval, the arrival clock time, and the update frequency may be obtained by using statistics such as the averages or the variances of a plurality of records in such a manner that the most recent several records of data are retained. In this case, influences of an abnormal value, deviations in arrival interval, and the like can be suppressed.

In the above-described embodiment, the sensor allocation information 51 is configured to be retained on a disk (the sensor DB 50). This example is, however, not limiting. For example, the sensor allocation information 51 may be retained only on the memory, instead of being permanently retained on the disk, by being generated with data of each sensor scanned at the startup.

The above-described embodiment assumes that a data clock time of an input piece of sensor data D is subject to updating of the latest clock time registered in the sensor DB 50 or registration of a newer clock time. This example is, however, not limiting. For example, when there is a need for processing such as registration, updating, or deletion for a clock time earlier than the latest already-registered clock time, a piece of sensor data D that has a data clock time earlier than the latest already-registered clock time may be subject to the processing.

In the above-described embodiment, the data file F in the sensor DB 50 retains only registered data from the sensors and is implemented in a form connecting the blocks B in order of clock times. This is, however, not limiting. For example, with an index such as B+TREE prepared, processing such as searching, updating, and deletion can be implemented in a more efficient manner.

In the above-described embodiment, the number of pages retained in the page buffer 42 is previously provided. This example is, however, not limiting. For example, the number of pages to be retained in the page buffer 42 may be configured to be dynamically determined based on at least one or a combination of the memory size of the buffer and the sensor allocation information 51.

In the above-described embodiment, the pages P are used as units each serving as one data area in which sensor data D of sensors belonging to the same group is stored. This example is, however, not limiting. For example, variable-length and continuous areas called segments may be used as such units. Alternatively, when the data file F is divided into a plurality of files, files can be used as such units. When the data file F is divided into a plurality of nodes, nodes can be used as such units. In each of these cases, the data area managing unit 40 may manage data areas in which sensor data D is stored, in units other than pages P.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A sensor data management apparatus that stores pieces of sensor data in data areas provided corresponding to prescribed data units and manage the pieces of sensor data, the pieces of sensor data having been input from a plurality of sensors, the sensor data management apparatus comprising:
    processing circuitry configured to function as:
        a group determining unit configured to analyze the pieces of stored sensor data to obtain reference data of each of the plurality of sensors and determine groups of the plurality of sensors by performing a grouping using the reference data as a key for the grouping;
        a data storing unit configured to:
        determine a storage location of a newly input piece of sensor data to store pieces of sensor data from sensors belonging to a same group of the groups in a same data area of the data areas, and
        store the newly input piece of sensor data at the storage location, wherein the groups are dynamically changed according to updating of the reference data; and
            a data area managing unit configured to, when, at the storage location that the data storing unit has determined, there is no unused area in which the newly input piece of sensor data is stored, generates a new data area that corresponds to one of the groups to which a sensor that has input the newly input piece of sensor data belongs, wherein the data storing unit stores the newly input piece of sensor data in the new data area generated by the data area managing unit.

2. The sensor data management apparatus according to claim 1, wherein
    each piece of sensor data includes clock time information, and
    the reference data includes registration intervals each calculated based on a difference of clock time information between two pieces of sensor data that have been input from the same sensor.

3. The sensor data management apparatus according to claim 1, wherein
    each piece of sensor data includes clock time information, and
    the reference data includes arrival times each calculated based on a difference between clock time information included in a piece of sensor data and a clock time at which the piece of sensor data is input.

4. The sensor data management apparatus according to claim 1, wherein
    each piece of sensor data includes clock time information, and
    the reference data includes update frequencies each calculated based on a difference between clock times at which two pieces of sensor data that have been input from the same sensor and include the same clock time information are input.

5. The sensor data management apparatus according to claim 1, wherein the prescribed units of data are units in which data is read and written between a buffer and a file, the buffer being configured to temporarily retain input pieces of sensor data, the file being configured for permanent management of sensor data.

6. The sensor data management apparatus according to claim 1, wherein each of the data areas is a set of data blocks in each of which sensor data from one sensor is stored.

7. A sensor data management method to be executed by a sensor data management apparatus that stores pieces of sensor data in data areas provided corresponding to prescribed data units and manage the pieces of sensor data, the pieces of sensor data having been input from a plurality of sensors, the sensor data management method comprising:
    analyzing the pieces of stored sensor data to obtain reference data of each of the plurality of sensors and determining groups of the plurality of sensors by performing a grouping using the reference data as a key for the grouping;
    determining a storage location of a newly input piece of sensor data to store pieces of sensor data from sensors belonging to a same group of the groups in a same data area of the data areas;
    storing the newly input piece of sensor data at the storage location, wherein the groups are dynamically changed according to updating of the reference data; and
    when, at the storage location, there is no unused area in which the newly input piece of sensor data is stored, generating a new data area that corresponds to one of the groups to which a sensor that has input the newly input piece of sensor data belongs, wherein storing the newly input piece of sensor data in the new data area.

8. A computer program product having a non-transitory computer readable medium including a plurality of instructions executable by a computer that stores pieces of sensor data in data areas provided corresponding to prescribed data units and manage the pieces of sensor data, the pieces of sensor data having been input from a plurality of sensors, wherein the instructions, when executed by the computer, cause the computer to perform:
    analyzing the pieces of stored sensor data to obtain reference data of each of the plurality of sensors and determining groups of the plurality of sensors by performing a grouping using the reference data as a key for the grouping; and determining a storage location of a newly input piece of sensor data to store pieces of sensor data from sensors belonging to a same group of the groups in a same data area of the data areas;

storing the newly input piece of sensor data at the storage location, wherein the groups are dynamically changed according to updating of the reference data; and when, at the storage location, there is no unused area in which the newly input piece of sensor data is stored, generating a new data area that corresponds to one of the groups to which a sensor that has input the newly input piece ole sensor data belongs, wherein storing the newly input piece of sensor data in the new data area.

* * * * *